(12) United States Patent
Yamamoto

(10) Patent No.: US 10,454,128 B2
(45) Date of Patent: Oct. 22, 2019

(54) ELECTRIC STORAGE APPARATUS AND METHOD OF MANUFACTURING ELECTRIC STORAGE APPARATUS

(75) Inventor: Rika Yamamoto, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 75 days.

(21) Appl. No.: 13/978,787

(22) PCT Filed: Mar. 28, 2011

(86) PCT No.: PCT/JP2011/001835
 § 371 (c)(1),
 (2), (4) Date: Jul. 9, 2013

(87) PCT Pub. No.: WO2012/131760
 PCT Pub. Date: Oct. 4, 2012

(65) Prior Publication Data
 US 2014/0011063 A1  Jan. 9, 2014

(51) Int. Cl.
 *H01M 10/04* (2006.01)
 *H01M 2/26* (2006.01)
 *H01M 2/30* (2006.01)

(52) U.S. Cl.
 CPC ....... *H01M 10/0431* (2013.01); *H01M 2/263* (2013.01); *H01M 2/30* (2013.01); *Y10T 29/49108* (2015.01)

(58) Field of Classification Search
 CPC .................................................. H01M 2/263
 See application file for complete search history.

(56) References Cited

U.S. PATENT DOCUMENTS

| | | | |
|---|---|---|---|
| 2005/0214642 A1* | 9/2005 | Kim et al. | 429/211 |
| 2005/0287429 A1* | 12/2005 | Cho | H01M 2/263 429/161 |
| 2006/0024568 A1 | 2/2006 | Lee | |
| 2006/0093910 A1 | 5/2006 | Yoon et al. | |
| 2010/0233521 A1* | 9/2010 | Byun | H01M 2/263 429/72 |

FOREIGN PATENT DOCUMENTS

| | | |
|---|---|---|
| CN | 1681146 | 10/2005 |
| CN | 101834305 A | 9/2010 |

(Continued)

*Primary Examiner* — Alix E Eggerding
(74) *Attorney, Agent, or Firm* — Finnegan, Henderson, Farabow, Garrett & Dunner, LLP

(57) ABSTRACT

An electric storage apparatus includes a power-generating element, a case, and an electrode terminal. The power-generating element is configured to have electrode plates wound with a separator and has a reaction area. The electrode plate has a collector plate and an active material layer formed on a portion of the collector plate. A connecting region adjacent to the reaction area of the power-generating element, in a state in which a portion of the collector plate of the electrode plate is wound in layers, is connected to the electrode terminal, the active material layer being not formed on the portion. The power-generating element has a bent portion provided by folding back the electrode plate and a cut portion at a position adjacent to the bent portion and formed by cutting a portion of the connecting region. The electrode terminal is fixed to the cut portion.

9 Claims, 4 Drawing Sheets

(56) References Cited

FOREIGN PATENT DOCUMENTS

| | | |
|---|---|---|
| EP | 2 228 852 A1 | 9/2010 |
| JP | 2006-40899 | 2/2006 |
| JP | 2006-128132 | 5/2006 |
| JP | 2009-26705 | 2/2009 |
| JP | 2010-129450 | 6/2010 |
| JP | 2010-212241 | 9/2010 |
| WO | WO 2009/013592 A2 | 1/2009 |

* cited by examiner

ELECTRIC STORAGE APPARATUS AND METHOD OF MANUFACTURING ELECTRIC STORAGE APPARATUS

CROSS-REFERENCE TO RELATED APPLICATIONS

This application is a national phase application of International Application No. PCT/JP2011/001835, filed Mar. 28, 2011, the content of which is incorporated herein by reference.

TECHNICAL FIELD

The present invention relates to an electric storage apparatus having a power-generating element partially bent and a method of manufacturing the electric storage apparatus.

BACKGROUND ART

A secondary battery has a power-generating element which performs charge and discharge and a case which accommodates the power-generating element. The power-generating element is formed of a positive electrode plate, a negative electrode plate, and a separator disposed between the positive electrode plate and the negative electrode plate. The positive electrode plate and the negative electrode plate are wound with the separator interposed between them to form the power-generating element.

On the other hand, the case is provided with a positive electrode terminal and a negative electrode terminal which are used to electrically connect the secondary battery to a load. A positive electrode internal terminal housed in the case is used to electrically connect the positive electrode terminal to the positive electrode plate of the power-generating element. A negative electrode internal terminal housed in the case is used to electrically connect the negative electrode terminal to the negative electrode plate of the power-generating element.

In a so-called square-type secondary battery, the power-generating element is housed in a rectangular case. The power-generating element is formed to have a shape conforming to an inner wall face of the case, and is thus partially bent. The positive electrode plate and the negative electrode plate are folded back in the bent portions of the power-generating element.

PRIOR ART DOCUMENTS

Patent Documents

[Patent Document 1] Japanese Patent Laid-Open No. 2006-128132
[Patent Document 2] Japanese Patent Laid-Open No. 2010-212241
[Patent Document 3] Japanese Patent Laid-Open No. 2009-026705
[Patent Document 4] Japanese Patent Laid-Open No. 2006-040899

DISCLOSURE OF THE INVENTION

Problems to be Solved by the Invention

When connection of the positive electrode internal terminal is attempted to the bent portion of the power-generating element in the square-type secondary battery, the bent portion may be distorted due to the force applied when the positive electrode internal terminal is connected, for example.

Means for Solving the Problems

According to a first aspect, the present invention provides an electric storage apparatus including a power-generating element, a case accommodating the power-generating element, and an electrode terminal connected to the power-generating element. The power-generating element is configured to have electrode plates wound with a separator interposed between them and has a reaction area where charge and discharge reactions occur. The electrode plate has a collector plate and an active material layer formed on a portion of the collector plate. A connecting region adjacent to the reaction area of the power-generating element, in a state in which a portion of the collector plate of the electrode plate is wound in layers, is connected to the electrode terminal, the active material layer being not formed on the portion. The power-generating element has a bent portion provided by folding back the electrode plate and a cut portion at a position adjacent to the bent portion and formed by cutting a portion of the connecting region. The electrode terminal is fixed to the cut portion.

The electrode plate includes a positive electrode plate and a negative electrode plate. The cut portion can be provided for at least one of the positive electrode plate and the negative electrode plate. The positive electrode plate can be formed of a collector plate and a positive electrode active material layer formed on a portion of the collector plate. The negative electrode plate can be formed of a collector plate and a negative electrode active material layer formed on a portion of the collector plate. The electrode terminal includes a positive electrode terminal and a negative electrode terminal.

The electrode terminal can be placed at a position inserted in the collector plate at the cut portion. This allows the entire cut portion to be easily contacted by the electrode terminal. In the cut portion, the collector plate can be wound in layers, and the electrode terminal can be placed at a position adjacent to the collector plate wound in the layers. The electrode terminal can be welded to the cut portion.

Since the connecting region is a region different from the reaction area, the formation of the cut portion in the connecting region has no influence on charge/discharge characteristics of the power-generating element. Specifically, the connecting region can be formed of the collector plate of the positive electrode plate or the collector plate of the negative electrode plate.

The electrode terminal, can be fixed to a region of the case that is opposite to the bent portion. This can locate the connecting portion of the power-generating element and the electrode terminal closer to the case to reduce the size of the electrode terminal. The reduced size of the electrode terminal can reduce the resistance in the electrode terminal.

According to a second aspect, the present invention provides a method of manufacturing an electric storage apparatus in which a power-generating element is accommodated by a case, and the method includes a first step and a second step. The power-generating element is configured to have electrode plates wound with a separator interposed between them. The electrode plate has a collector plate and an active material layer formed on a portion of the collector plate. The power-generating element has a reaction area where charge and discharge reactions occur and a connecting region including a portion of the collector plate of the electrode plate, the active material layer being not formed on the portion, an electrode terminal being connected to the connecting region. At the first step, a cut portion is formed by cutting a portion of the connecting region at a position adjacent to a bent portion provided by folding back the electrode plate in the power-generating element. At the second step, the electrode terminal is connected to the cut portion in a state in which a portion of the collector plate in the connecting region is wound in the layers.

The electrode terminal can be placed at a position inserted in the collector plate at the cut portion at the second step. The electrode terminal can be placed at a position adjacent to the collector plate wound in the layers in the cut portion at the second step.

Advantage of the Invention

According to the present invention, the cut portion can be provided at the position adjacent to the bent portion of the power-generating element to facilitate the fixing of the electrode terminal to the cut portion. The collector plate is easily deformed along the electrode terminal, at the cut portion, and no distortion occurs in the bent portion due to the fixing of the electrode terminal.

MODE FOR CARRYING OUT THE INVENTION

Embodiments of the present invention will hereinafter be described.
Embodiment 1

A cell (electric storage apparatus) which is Embodiment 1 of the present invention is described. A secondary battery such a nickel metal hydride battery and a lithium-ion battery can be used as the cell. An electric double layer capacitor may be used instead of the secondary battery.

The cell of the present embodiment can be mounted on a vehicle, for example. Specifically, a plurality of such cells can be connected electrically in series to constitute an assembled battery which can be mounted on the vehicle. The output from the assembled battery can be used as energy for running of the vehicle.

Specifically, an electric energy output from the assembled battery can be converted by a motor generator into a kinetic energy for running of the vehicle. A kinetic energy generated in braking of the vehicle can be converted by the motor generator into an electric energy which in turn can be stored in the assembled battery.

Figure 1:
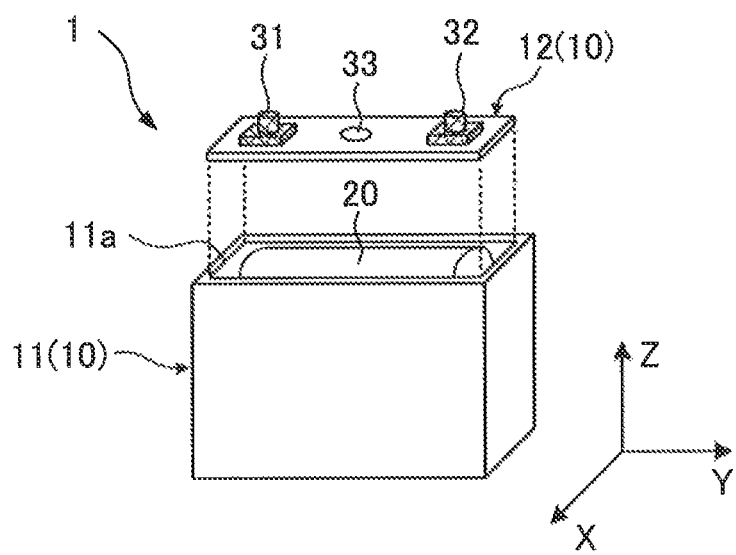
FIG. 1 An exploded view showing a cell which is Embodiment 1.
Figure 2:
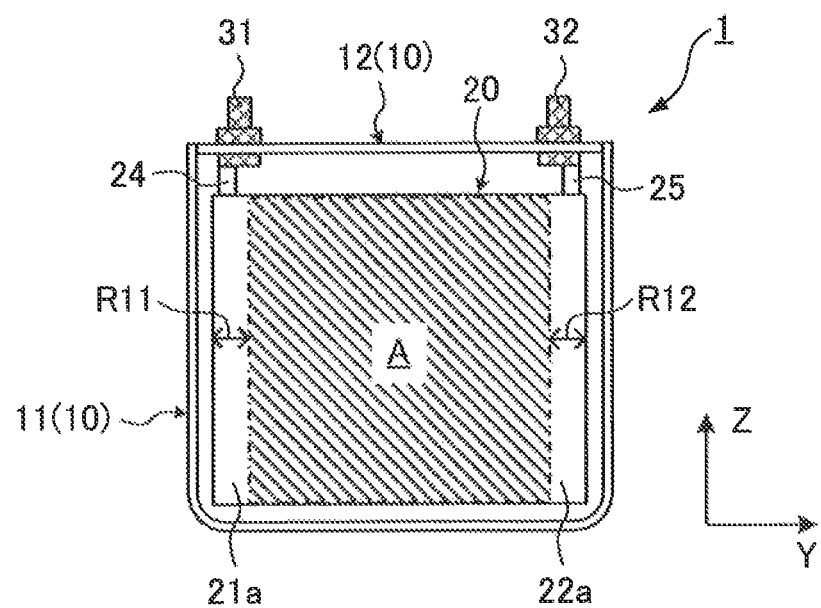
FIG. 2 A diagram showing the internal structure of the cell which is Embodiment 1.

FIG. 1 is an exploded view showing the cell which is the present embodiment. FIG. 2 is a diagram showing the internal structure of the cell which is the present embodiment. In FIG. 1 and FIG. 2, an X axis, a Y axis, and a Z axis are axes orthogonal to each other. The relationship between the X axis, the Y axis, and the Z axis applies to the other figures.

The cell 1 has a case 10 and a power-generating element 20 housed in the case 10. The case 10 has a case body 11 and a lid 12 which are made of metal (for example, aluminum) The case body 11 has an opening portion. 11a used for incorporating the power-generating element 20 into the case body 11.

The lid 12 is placed at a position for closing the opening portion 11a of the case body 11. The lid 12 can be welded to the opening portion 11a to set the case 10 in a sealed state. A positive electrode terminal 31 and a negative electrode terminal 32 are fixed to the lid 12. The positive electrode terminal 31 and the negative electrode terminal 32 are insulated from the lid 12.

A valve 33 is provided for the lid 12 and is positioned between the positive electrode terminal 31 and the negative electrode terminal 32. The valve 33 is used to cause gas produced within the case 10 to be released to the outside of the case 10. Overcharge or the like of the cell 1 may produce gas from the power-generating element 20. The internal pressure of the case 10 is increased with the production of the gas. When the internal pressure of the case 10 reaches the operating pressure of the valve 33, the valve 33 switches from a closed state to an open state. This allows the gas produced within the case 10 to be released to the outside of the case 10.

Figure 3:
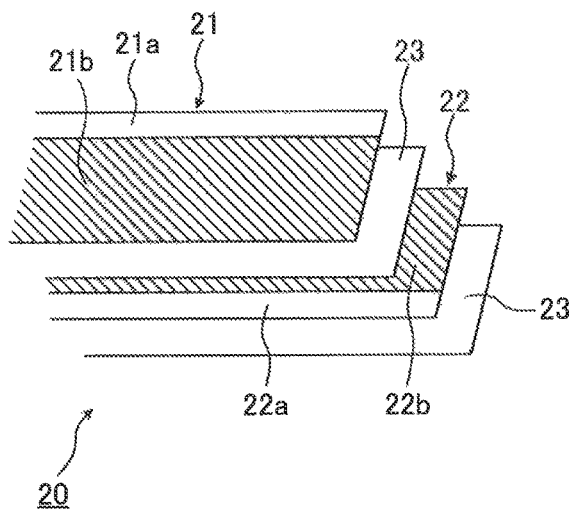
FIG. 3 A developed view of a power-generating element in Embodiment 1.

The power generating element 20 is an element capable of performing charge and discharge. As shown in FIG. 3, the power-generating element 20 has a positive electrode plate (electrode plate) 21, a negative electrode plate (electrode plate) 22, and a separator (containing an electrolytic solution) 23 disposed between the positive electrode plate 21 and the negative electrode plate 22. FIG. 3 is a developed view of the power-generating element 20.

The positive electrode plate 21 has a collector plate 21a and a positive electrode active material layer 21b formed on each surface of the collector plate 21a. The positive electrode active material layer 21b is formed on both surfaces of the collector plate 21a but is not formed in a region of the collector plate 21a. The positive electrode active material layer 21b includes a positive electrode active material, a conductive agent, a binder and the like.

The negative electrode plate 22 has a collector plate 22a. and a negative electrode active material layer 22b formed on each surface of the collector plate 22a. The negative electrode active material layer 22b is formed on both surfaces of the collector plate 22a but is not formed in a region of the collector plate 22a. The negative electrode active material layer 22b includes a negative electrode active material, a conductive agent, a binder and the like. The collector plates 21a and 22a can be made of metal such as aluminum and copper, for example.

The positive electrode plate 21, the negative electrode plate 22, and the separator 23 are stacked as shown in FIG. 3 and the stack is wound to provide the power-generating element 20 shown in FIG. 2. In FIG. 2, an area A of the power-generating element 20 is the area where the positive electrode active material layer 21b and the negative electrode active material layer 22b are placed one on the other, and corresponds to the reaction area where charge and discharge reactions are caused.

The power-generating element 20 shown in FIG. 2 has, at one end (on the left of the area A), a region (referred to as a positive electrode connecting region) R11 where only the collector plate 21a of the positive electrode plate 21 is wound. A positive electrode internal terminal 24 is connected to the positive electrode connecting region R11. The positive electrode internal terminal 24 and the collector plate 21a are connected to each other by welding, for example. The positive electrode internal terminal 24 is also connected to the positive electrode terminal 31. The positive electrode internal terminal 24 and the positive electrode terminal 31 are connected to each other by welding, for example. The positive electrode internal terminal 24 is used to electrically connect the power-generating element 20 (positive electrode connecting region R11) to the positive electrode terminal 31.

While the positive electrode internal terminal 24 and the positive electrode terminal 31 are formed as the separate components in the present embodiment, they may be provided as an integrated component. When the positive electrode internal terminal 24 and the positive electrode terminal 31 are formed as the separate components, the positive electrode internal terminal 24 corresponds to an electrode terminal in the present invention. When the positive electrode internal terminal 24 and the positive electrode terminal 31 are formed as the integrated component, they correspond to the electrode terminal in the present invention.

The power-generating element shown in FIG. 2 has, at the other end (on the right of the area A), a region (referred to as a negative electrode connecting region) R12 where only the collector plate 22a of the negative electrode plate 22 is wound. A negative electrode internal terminal 25 is connected to the negative electrode connecting region R12. The negative electrode internal terminal 25 and the collector plate 22a are connected to each other by welding, for example. The negative electrode internal terminal 25 is also connected to the negative electrode terminal 32. The negative electrode internal terminal 25 and the negative electrode terminal 32 are connected to each other by welding, for example. The negative electrode internal terminal 25 is used to electrically connect the power-generating element 20 (negative electrode connecting region R12) to the negative electrode terminal 32.

While the negative electrode internal terminal 25 and the negative electrode terminal 32 are formed as the separate components in the present embodiment, they may be provided as an integrated component. When the negative electrode internal terminal 25 and the negative electrode terminal. 32 are formed as the separate components, the negative electrode internal terminal 25 corresponds to an electrode terminal in the present invention. When the negative electrode internal terminal 25 and the negative electrode terminal 32 are formed as the integrated component, they correspond to the electrode terminal in the present invention.

Next, a method of manufacturing the cell 1 is described in brief.

First, the power-generating element 20 is prepared and is incorporated into the case body 11. In incorporating the power-generating element 20 into the case body 11, the power-generating element 20 and the lid 12 (including the positive electrode terminal 31 and the negative electrode terminal 32) are integrally provided such that the positive electrode internal terminal 24 and the negative electrode internal terminal 25 are interposed between them. The positive electrode internal terminal 24 and the negative electrode internal terminal 25 are connected to the power-generating element 20, and the positive electrode terminal 31 and the negative electrode terminal 32 fixed to the lid 12 are connected to the positive electrode internal terminal 24 and the negative electrode internal terminal 25, respectively.

The lid 12 can be fixed to the opening portion 11a of the case body 11 to set the case 10 in a sealed state. Next, the electrolytic solution is injected into the case 10, and an injection port for the electrolytic solution formed in the case 10 is closed. Through those operations, the cell 11 can be provided.

The electrolytic solution injected into the case 10 is mainly infiltrated into the separator 23, the positive electrode active material layer 21b, and the negative electrode active material layer 22b. The electrolytic solution is also present in the space formed within the case 10 except for the power-generating element 20.

Next, specific description is made of a method of connecting the positive electrode internal terminal 24 and the negative electrode internal terminal 25 to the power-generating element 20.

Figure 4:
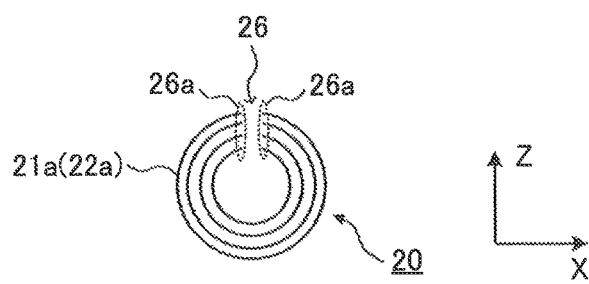
FIG. 4 A diagram for explaining a method of connecting the power-generating element to a positive electrode internal terminal in Embodiment 1.

As shown in FIG. 3, the positive electrode plate 21, the separator 23, and the negative electrode plate 22 are stacked, and the stack is wound around a predetermined axis to produce the power-generating element 20 having the shape shown in FIG. 4. A direction (Y direction) orthogonal to the sheet of FIG. 4 corresponds to the direction in which the predetermined axis extends. After the stack is wound, the end of the stack can be secured by a tape or the like to maintain the power-generating element 20 in the shape shown in FIG. 4.

As shown in FIG. 4, a slit 26 is formed in the power-generating element 20. The slit 26 is formed in each of the positive electrode connecting region R11 and the negative electrode connecting region R12 of the power-generating element 20 and extends in the Y direction. FIG. 4 is a diagram when the positive electrode connecting region R11 of the power-generating element 20 is viewed from the Y direction. While FIG. 4 shows the slit 26 formed in the positive electrode connecting region R11, the slit similar to the slit 26 shown in FIG. 4 is formed in the negative electrode connecting region R12.

Since the positive electrode connecting region R11 and the negative electrode connecting region R12 have the same structure, the following description is made mainly of the structure of the positive electrode connecting region R11.

The slit 26 can be formed by using an apparatus (for example, a cutter) capable of cutting the collector plate 21a. It is only required that the slit 26 should be formed in the positive electrode connecting region R11. Specifically, it is only required that the slit 26 should be formed within the range of the positive electrode connecting region R11 in the Y direction. In the reaction area A, the slit 26 is not formed, and the stack formed, of the positive electrode plate 21, the separator 23, and the negative electrode plate 22 is wound.

The slit 26 is formed from the edge of the power-generating element. 20 in the Y direction toward the inside in the present embodiment. Since it is only required that the slit 26 should be formed within the range of the positive electrode connecting region R11, the slit 26 may not be formed at the edge of the power-generating element 20 in the Y direction. In other words, the collector plate 21a may be present on both sides of the slit 26 in the Y direction.

In the plane shown in FIG. 4, the slit 26 extends from the center to the outer periphery of the power-generating element 20. Since the slit 26 is formed, the collector plate 21a in the positive electrode connecting region R11 has a plurality of cut portions 26a which make up the slit 26.

Figure 5:
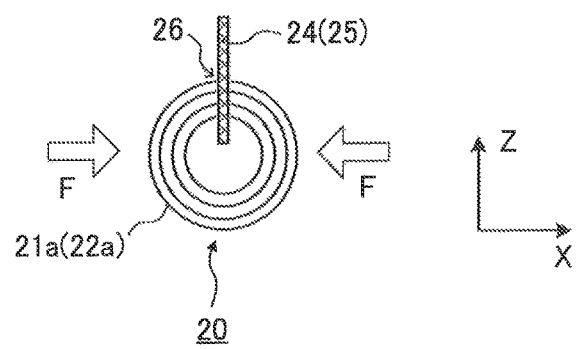
FIG. 5 A diagram for explaining the method of connecting the power-generating element, to the positive electrode internal terminal in Embodiment 1.

Next, as shown in FIG. 5, the positive electrode internal terminal 24 is inserted into the slit 26 formed in the power-generating element 20 (positive electrode connecting region R11). Since the slit 26 extends to the edge of the power-generating element 20 in the Y direction, the positive electrode internal terminal 24 can be inserted into the slit 26 by sliding the positive electrode internal terminal 24 into the power-generating element 20 in the Y direction. Since the slit 26 extends from the central portion to the outer periphery of the power-generating element 20 in the plane shown in FIG. 5, one end of the positive electrode internal terminal 24 can be positioned at the central portion of the power-generating element 20 and the other end of the positive electrode internal terminal 24 can be positioned outside the power-generating element 20.

As shown in FIG. 2, the length of the positive electrode internal terminal 24 in the Y direction is smaller than the length of the slit 26 in the Y direction in the present embodiment, so that the whole positive electrode internal terminal 24 in the Y direction is inserted into the slit 26. Alternatively, the length of the positive electrode internal terminal 24 in the Y direction may be equal to or larger than the length of the slit 26 in the Y direction. In this case, a portion of the positive electrode internal terminal 24 protrudes from the slit 26 in the Y direction.

Forces indicated by arrows F in FIG. 5 are applied to the power-generating element 20 in which the positive electrode internal terminal 24 is inserted in the slit 26. The forces shown by the arrows F are the forces which press and hold the power-generating element 20 from both sides thereof in the X direction. The application of the forces indicated by the arrows F to the power-generating element 20 can deform the power-generating element 20 into a shape shown in FIG. 6.

Figure 6:
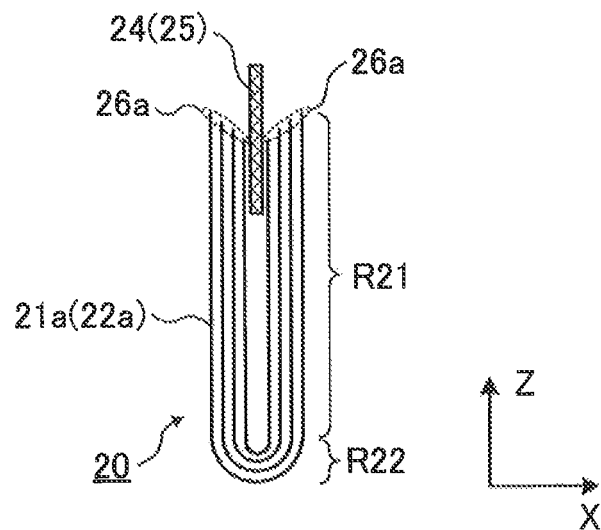
FIG. 6 A diagram for explaining the method of connecting the power-generating element to the positive electrode internal terminal in Embodiment 1.

Since FIG. 6 shows the shape of the collector plate 21a in the positive electrode connecting region R11, the collector plate 21a has the plurality of cut portions 26a formed therein. Since the slit 26 is not formed in the reaction area A of the power-generating element 20, the stack formed of the positive electrode plate 21, the separator 23, and the negative electrode plate 22 is wound. The reaction area A has portions (bent portions) at both ends in the Z direction where the stack is folded back. The bent portion positioned at the top of the reaction area A is opposite to the lid. 12, and the bent portion positioned at the bottom of the reaction area A is opposite to a bottom face of the case body 11.

The power-generating element 20 shown in FIG. 6 has a first region R21 along the plane (Y-Z plane) of the positive electrode internal terminal 24 and a second region R22 having a curvature. The first region R21 is placed along the side face of the case body 11 that forms the Y-Z plane. The second region R22 is placed along the bottom face (X-Y plane) of the case body 11.

In the state shown in FIG. 5, the plurality of cut portions 26a in the collector plate 21a are opposite to the positive electrode internal terminal 24 in the X direction. On the other hand, in the state shown in FIG. 6, the plurality of cut portions 26a in the collector plate 21a face toward a direction (upper direction in FIG. 6) along the plane (Y-Z plane) of the positive electrode internal terminal 24.

As shown in FIG. 6, the plurality of cut portions 26a are positioned such that the positive electrode internal terminal 24 is present therebetween. The plurality of cut portions 26a on each side of the positive electrode internal terminal 24 are disposed at different positions in the Z direction, The innermost of the collector plate 21a of the power-generating element 20 has the first region R21 of the smallest length in the Z direction. The outermost of the collector plate 21a of the power-generating element 20 has the first region R21 of the largest length in the Z direction. The first regions R21 have the lengths in the Z direction that are increased stepwise from inside to outside of the power-generating element 20.

Since the positive electrode connecting region R1 of the power-generating element 20 is provided by winding the collector plate 21a, the length of the collector 21a in the circumferential direction of the power-generating element 20 in the plane shown in FIG. 4 varies depending on the position in the diameter direction of the power-generating element 20. Specifically, the innermost of the collector plate 21a of the power-generating element 20 has the smallest length in the circumferential direction, and the outermost of the collector plate 21a of the power-generating element 20 has the largest length in the circumferential direction. Thus, the application of the forces indicated by the arrows F to the power-generating element 20 shown in FIG. 5 allows the plurality of cut portions 26a in the collector plate 21a to be placed in the positional relationship shown in FIG. 6.

Figure 7:
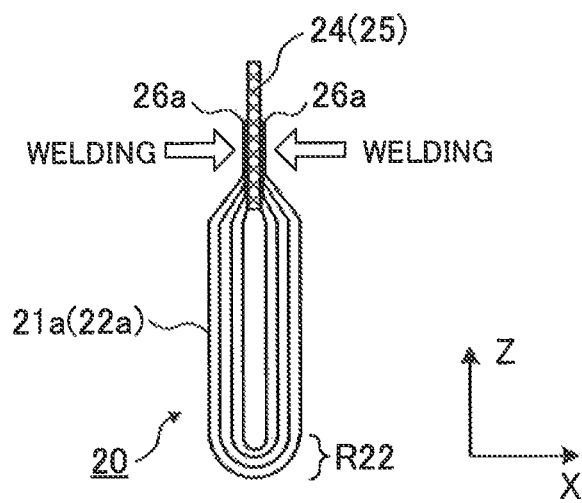
FIG. 7 A diagram for explaining the method of connecting the power-generating element to the positive electrode internal terminal in Embodiment 1.

Next, as shown in FIG. 7, the plurality of cut portions 36a are welded to the positive electrode internal terminal 24. As described above, a portion of the collector plate 21a farther from the positive electrode internal terminal 24 in the X direction has the first region R21 of a larger length in the Z direction. Thus, when the plurality of cut portions 26a are brought closer to the positive electrode internal terminal 24, all the cut portions 26a can be contacted by the positive electrode internal terminal 24.

If all the portions of the collector plate 21a have the first regions R21 of the same length in the Z direction, it is difficult to bring the cut portion 26a positioned in the outermost layer of the collector plate 21a of the power-generating element 20 into contact with the positive electrode internal terminal 24.

If the cut portion 26a in the outermost layer of the collector plate 21a is not in contact with the positive electrode internal terminal 24, that cut portion 26a is contacted by the collector plate 21a positioned inward of the outermost layer of the collector plate 21a in the power-generating element 20. In this case, between the outermost layer of the collector plate 21a and the positive electrode internal terminal 24, another portion of the collector plate 21a is present. This lengthens the current path between the outermost layer of the collector plate 21a and the positive electrode internal terminal 24 and increases the resistance.

Since the plurality of cut portions 26a can be contacted by the positive electrode internal terminal 24 in the present embodiment, electrical conduction can be improved between each portion of the collector plate 21a and the positive electrode internal terminal 24. In the present embodiment, the positive electrode internal terminal 24 is preferably placed at the position corresponding to the central portion of the power-generating element 20 in the X direction. Thus, all the portions of the collector plate 21a, between which the positive electrode internal terminal 24 is present in the X direction, can easily contact the positive electrode internal terminal 24.

As described above, the positive electrode internal terminal 24 can be welded to the collector plate 21a in the positive electrode connecting region R11 to fix the positive electrode internal terminal 24 to the power-generating element 20. The negative electrode internal terminal 25 can also be welded to the collector plate 22a in the negative electrode connecting region R12 to fix the negative electrode internal terminal 25 to the power-generating element 20. In the positive electrode connecting region R11, a plurality of portions of the collector plates 21a that are not connected to the positive electrode internal terminal 24 can be brought into contact with each other, for example by welding. In the negative electrode connecting region R12, a plurality of portions of the collector plates 22a that are not connected to the negative electrode internal terminal 25 can be brought into contact with each other, for example by welding.

According to the present embodiment, the cut portion 26a is placed at the position adjacent to the bent portion of the reaction area A in the Y direction, and the position of the connection between the positive electrode connecting region R11 and the positive electrode internal terminal 24 can be located closer to the positive electrode terminal 31. This can prevent an increase in size of the positive electrode internal terminal 24. In addition, the slit 26 is formed in the collector plate 21a in the positive electrode connecting region R11 to allow the easy connection of the collector plate 21a in the positive electrode connecting region R11 to the positive electrode internal terminal 24. These advantages are also achieved in the connection between the negative electrode connecting region R11 and the negative electrode internal terminal 25.

To locate the position of the connection between the collector plate 21a and the positive electrode internal terminal 24 closer to the positive electrode terminal 31 if the slit 26 is not formed, the positive electrode internal terminal 24 is connected to a folded portion (referred to as a bent portion) of the collector plate 21a. An external force applied in connecting the positive electrode internal terminal 24 to the bent portion of the collector plate 21a may distort the bent portion of the collector plate 21a.

If the collector plate 21a in the positive electrode connecting region R11 is distorted, the distortion may influence the reaction area A (see FIG. 2) adjacent to the positive electrode connecting region R11. Since the reaction area A is the area having a dominant effect on the input/output characteristics of the cell 1, the influence of the distortion upon the reaction area A may adversely affect the input/output characteristics of the cell 1. The collector plate 22a in the negative electrode connecting region R12 may also be distorted in connecting the negative electrode internal terminal 25 to the negative electrode connecting region R12.

In the present embodiment, the formation of the slit 26 avoids the formation of the bent portion in the collector plate 21a. Specifically, since the collector plate 21a connected to the positive electrode internal terminal 24 is placed in the direction along the positive electrode internal terminal 24 (see FIG. 6), the distortion of the collector plate 21a can be prevented. If no distortion occurs in the positive electrode connecting region R11, the reaction area A is not influenced by such distortion.

Since the positive electrode internal terminal 24 is inserted into the slit 26 in the present embodiment, it is only required that the positive electrode internal terminal 24 should be extended from the positive electrode connecting region R11 of the power-generating element 20 toward the positive electrode terminal 31, which eliminates the need to form the positive electrode internal terminal 24 in a complicated shape.

While the slit 26 is formed in each of the positive electrode connecting region R11 and the negative electrode connecting region R12 in the present embodiment, the present invention is not limited thereto. Specifically, the slit 26 may be formed only in one of the positive electrode connecting region R11 and the negative electrode connecting region R12. In this case, the advantages similar to those in the present embodiment can be achieved in the connecting region (R11 or R12) in which the slit 26 is formed.

While the slit 26 is formed in the concentrically wound collector plates 21a and 22a (see FIG. 4) in the present embodiment, the present invention is not limited thereto. Specifically, after the concentrically wound collector plates 21a and 22a are deformed by the forces indicated by the arrows F shown in FIG. 5, the slit 26 may be formed in the collector plates 21a and 22a.

While the slit 26 extends from the center to the outer periphery of the power-generating element 20 in the present embodiment, the present invention is not limited thereto. In other words, the slit 26 may be formed only in a portion of the concentrically wound collector plates 21a and 22a. Specifically, the slit 26 may be formed only in a portion of each of the concentrically wound collector plates 21a and 22a that is positioned closer to the outer periphery of the power-generating element 20, wherein the slit 26 is not formed in the remaining portion of the collector plates 21a and 22a that is positioned closer to the inner periphery of the power-generating element 20. In this case, the end portion of the positive electrode internal terminal 24 (or the negative electrode internal terminal 25) does not reach the center of the power-generating element 20.

In the present embodiment, before the concentrically wound collector plates 21a and 22a are deformed by the forces indicated by the arrows F shown in FIG. 5, the positive electrode internal terminal 24 and the negative electrode internal terminal 25 are inserted into the slits 26 formed in the collector plates 21a and 22a. However, the present invention is not limited thereto, it is only required that the positive electrode internal terminal 24 and the negative electrode internal terminal 25 should be inserted into the slit 26 before the collector plates 21a and 22a are welded to the positive electrode internal terminal 24 and the negative electrode internal terminal 25.

For example, after the slits 26 are formed in the concentrically wound collector plates 21a and 22a, the collector plates 21a and 22a may be deformed by the forces indicated by the arrows F shown in FIG. 5. Next, the positive electrode internal terminal 24 and the negative electrode internal terminal 25 may be inserted into the positions corresponding to the slits 26 in the deformed collector plates 21a and 22a (see FIG. 6).

Embodiment 2

A cell 1 which is Embodiment 2 of the present invention will be described. In the present embodiment, the members having the same functions as those of the members described in Embodiment 1 are designated with the same reference numerals, and detailed description thereof is omitted, in the present embodiment, description is made mainly of differences from Embodiment 1.

In Embodiment 1, the slit 26 is formed in each of the collector plate 21a in the positive electrode connecting region R11 and the collector plate 22a in the negative electrode connecting region R12, and the positive electrode internal terminal 24 and the negative electrode internal terminal 25 are inserted into the slits 26. In the present embodiment, however, a slit 26 is formed in each of a collector plate 21a in a positive electrode connecting region R11 and a collector plate 22a in a negative electrode connecting region R12, but a positive electrode internal terminal 24 and a negative electrode internal terminal 25 are not inserted into the slits 26.

Figure 8:
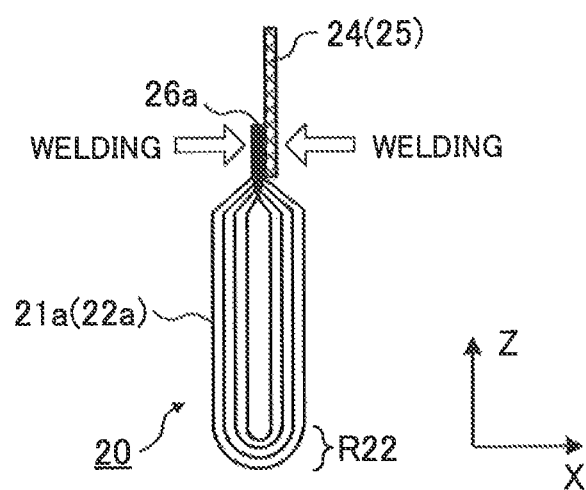
FIG. 8 A diagram for explaining a structure of connecting a power-generating element to a positive electrode internal terminal in Embodiment 2.

FIG. 8 is a diagram showing the structure of connection between a power-generating element 20 (positive electrode connecting region R11) and the positive electrode internal terminal 24 and corresponds to FIG. 7. While FIG. 8 shows the structure of connection between the positive electrode connecting region R11 and the positive electrode internal terminal 24, the structure of connection between the negative electrode connecting region R12 and the negative electrode internal terminal 25 may have a structure similar to that in FIG. 8.

As shown in FIG. 8, a plurality of portions of the collector plate 21a in the positive electrode connecting region R11 are welded to each other. The plurality of portions of the collector plate 21a are welded to each other in the region including cut portions 26a. The positive electrode internal terminal 24 is welded to the plurality of portions of the collector plate 21a welded to each other. The positive electrode internal terminal 24 is fixed to the outermost layer of the collector plate 21a in the power-generating element 20.

Next, specific description is made of a method of connecting the positive electrode internal terminal 24 to the power-generating element 20. Since a method of connecting the negative electrode internal terminal 25 to the power-generating element 20 is similar to the method of connecting the positive electrode internal, terminal 24 to the power-generating element 20, detailed description thereof is omitted.

In the present embodiment, similarly to Embodiment 1 (FIG. 4), a positive electrode plate 21, a negative electrode plate 22, and a separator 23 are stacked to provide a stack which in turn is wound around a predetermined axis to form the power-generating element 20. Then, the slit 26 is formed in the positive electrode connecting region R11 of the power-generating element 20. Thus, the plurality of cut portions 26a are formed in the collector plate 21a in the positive electrode connecting region R11.

Next, the power-generating element 20 having the slit 26 formed therein is deformed by forces as indicated by the arrows F in FIG. 5. As a result, the collector plate 21a in the positive electrode connecting region R11 has a first region R21 along a predetermined plane (Y-Z plane) and a second region R22 having a curvature (see FIG. 6). Next, the regions including the plurality of cut portions 26 are welded to each other. The positive electrode internal terminal 24 is welded to the region in which the portions of the collector plate 21a are welded to each other. Those operations provide the structure shown in FIG. 8.

The welding of the regions including the plurality of cut portions 26a and the welding of the positive electrode internal terminal 24 can be performed at different times or at the same time. When the welding steps are performed at different times, the regions including the plurality of cut portions 26 may be welded to each other, and then the positive electrode internal terminal 24 may be welded. Alternatively, after the positive electrode internal terminal 24 is welded to the outermost layer of the collector plate 21a in the power-generating element 20, the regions including the plurality of cut portions 26a may be welded to each other.

According to the present embodiment, similarly to Embodiment 1, the formation of the slit 26 in the positive electrode connecting region R11 avoids the formation of a folded portion (bent portion) of the collector plate 21a. This can prevent occurrence of distortion in the collector plate 21a during the welding of the positive electrode internal terminal 24 to the collector plate 21a.

The structure described in Embodiment 1 can be connected with the structure described in Embodiment 2. For example, the structure described in Embodiment 1 can be used for the connection between the positive electrode connecting region R11 and the positive electrode internal terminal 24, and the structure described in Embodiment 2 can be used for the connection between the negative electrode connecting region R12 and the negative electrode internal terminal 25.

The invention claimed is:

1. An electric storage apparatus comprising:
a power-generating element in which electrode plates are wound with a separator interposed between them, each of the electrode plates having a collector plate and an active material layer formed on a portion of the collector plate, the power-generating element having a reaction area where charge and discharge reactions occur;
a case accommodating the power-generating element; and
an electrode terminal connected to the power-generating element,
wherein a connecting region adjacent to the reaction area of the power-generating element, in a state in which a portion of the collector plate of the electrode plate is wound in layers, is connected to the electrode terminal, the active material layer being not formed on the portion,
the power-generating element has a bent portion where the electrode plate is bent and a cut portion where a portion of the connecting region is discontinuous, wherein the cut portion includes a first cut end and a second cut end, and the cut portion is formed only in the connecting region, the electrode plates wound in layers extending to different positions at the cut portion in a length direction of the electrode terminal,
the electrode terminal is placed between a plurality of edges of the collector plate at the cut portion extending to different positions in the length direction of the electrode terminal and is fixed to the cut portion, and
a length of the connecting region from the first cut end to the second cut end in a circumferential direction of the power-generating element is equal to a length of the reaction area in the circumferential direction of the power-generating element.

2. The electric storage apparatus according to claim 1, wherein the electrode terminal is fixed to a region of the case that is opposite to the bent portion.

3. The electric storage apparatus according to claim 1, wherein the electrode terminal and the cut portion are formed of metal and are melted to join each other.

4. An electric storage apparatus comprising:
a power-generating element in which electrode plates are wound with a separator interposed between them, each of the electrode plates having a collector plate and an active material layer formed on a portion of the collector plate, the power-generating element having a reaction area where charge and discharge reactions occur;
a case accommodating the power-generating element; and
an electrode terminal connected to the power-generating element,
wherein a connecting region adjacent to the reaction area of the power-generating element, in a state in which a portion of the collector plate of the electrode plate is wound in layers, is connected to the electrode terminal, the active material layer being not formed on the portion, the power-generating element has a bent portion where the electrode plate is bent and a cut portion where a portion of the connecting region is discontinuous, wherein the cut portion includes a first cut end and a second cut end, and the cut portion is formed only in the connecting region, the electrode plates wound in layers extending to different positions at the cut portion in a length direction of the electrode terminal, the electrode terminal is placed at a position adjacent to the collector plate wound in the layers in the cut portion and is fixed to the cut portion, the electrode terminal is placed on an outermost surface of the connecting region in a layer direction of the collector plate, the electrode terminal is in direct contact with the outermost surface, and the outermost surface is an outermost surface of the collector plate in the cut portion in a layer direction of the collector plate.

5. The electric storage apparatus according to claim 4, wherein the electrode terminal is fixed to a region of the case that is opposite to the bent portion.

6. The electric storage apparatus according to claim 4, wherein the electrode terminal and the cut portion are formed of metal and are melted to join each other.

7. A method of manufacturing an electric storage apparatus in which a power-generating element is accommodated by a case, the power-generating element in which electrode plates are wound with a separator interposed between them, each of the electrode plates having a collector plate and an active material layer formed on a portion of the collector plate, the power-generating element having a reaction area where charge and discharge reactions occur and a connecting region including a portion of the collector plate of the electrode plate, the active material layer being not formed on the portion, an electrode terminal being connected to the connecting region, the method comprising:

a first step of forming a cut portion by cutting a portion of the connecting region at a position adjacent to a bent portion provided by folding back the electrode plate in the power-generating element without changing a length of the power-generating element in a circumferential direction thereof, the cut portion being a portion where the connecting region is discontinuous, the cut portion including a first cut end and a second cut end, and the cut portion being formed only in the connecting region; and a second step of connecting the electrode terminal to the cut portion in a state in which a portion of the collector plate is wound in layers in the connecting region.

8. The method of manufacturing the electric storage apparatus according to claim 7, wherein the electrode terminal is placed at a position inserted in the collector plate at the cut portion at the second step.

9. The method of manufacturing the electric storage apparatus according to claim 7, wherein the electrode terminal is placed at a position adjacent to the collector plate wound in the layers in the cut portion at the second step.

* * * * *